United States Patent
Taylor (10) Patent No.: US 9,445,451 B2
(45) Date of Patent: Sep. 13, 2016

(54) COMMUNICATING ARBITRARY ATTRIBUTES USING A PREDEFINED CHARACTERISTIC

(71) Applicant: Leeo, Inc., Palo Alto, CA (US)

(72) Inventor: Kyle Taylor, Sunnyvale, CA (US)

(73) Assignee: Leeo, Inc., Palo Alto, CA (US)

( * ) Notice: Subject to any disclaimer, the term of this patent is extended or adjusted under 35 U.S.C. 154(b) by 0 days.

(21) Appl. No.: 14/518,689

(22) Filed: Oct. 20, 2014

(65) Prior Publication Data
US 2016/0113056 A1   Apr. 21, 2016

(51) Int. Cl.
*H04B 7/00* (2006.01)
*H04W 76/04* (2009.01)
*G08C 17/02* (2006.01)
*H04W 4/00* (2009.01)

(52) U.S. Cl.
CPC ............ *H04W 76/043* (2013.01); *G08C 17/02* (2013.01); *H04W 4/005* (2013.01); *H04W 4/008* (2013.01)

(58) Field of Classification Search
CPC .................................................... H04W 4/008
USPC ......................................................... 455/41.3
See application file for complete search history.

(56) References Cited

U.S. PATENT DOCUMENTS

| 900,595 | A | 10/1908 | Sanders |
| 988,665 | A | 4/1911 | Ripson |
| 3,030,806 | A | 4/1962 | Merlin |
| 3,499,664 | A | 3/1970 | Burns |
| 3,722,501 | A | 3/1973 | Derouineau |
| 3,767,933 | A | 10/1973 | Bogue |

(Continued)

FOREIGN PATENT DOCUMENTS

| EP | 1500955 A1 | 1/2005 |
| GB | 2454731 A | 5/2009 |

(Continued)

OTHER PUBLICATIONS

Albea, "High Performance Control Design for Dynamic Voltage Scaling Devices", IEEE Transactions on Circuits and Systems, Part 1, Regular Papers 58, 12, Nov. 17, 2011, pp. 2919-2930.

(Continued)

*Primary Examiner* — Wesley Kim
*Assistant Examiner* — Raj Chakraborty
(74) *Attorney, Agent, or Firm* — Steven Stupp; Aurora Consulting Group LLC (57) ABSTRACT

An electronic device that communicates input messages and output messages with another electronic device using a Bluetooth Low Energy communication protocol is described. In particular, the electronic device receives input messages using a predefined characteristic to convey input information associated with a set of input attribute types. A given input message includes one or more input-command characters specifying a given input attribute type in the set of input attribute types and, optionally, an input delimiter and an input value in an input argument associated with the given input attribute type. Moreover, the electronic device provides output messages using the predefined characteristic to convey output information associated with a set of output attribute types. A given output message includes one or more output-command characters specifying a given output attribute type in the set of output attribute types. In this way, the predefined characteristic can be repurposed to convey other attribute types.

20 Claims, 5 Drawing Sheets (56) References Cited

U.S. PATENT DOCUMENTS

| | | |
|---|---|---|
| 3,895,638 A | 7/1975 | Ito |
| 4,093,867 A | 6/1978 | Shah |
| 4,286,470 A | 9/1981 | Lynnworth |
| 4,418,333 A | 11/1983 | Schwarzbach |
| 4,450,436 A | 5/1984 | Massa |
| 4,772,126 A | 9/1988 | Allemand |
| 4,812,827 A | 3/1989 | Scripps |
| 4,829,283 A | 5/1989 | Spang |
| 4,896,039 A | 1/1990 | Fraden |
| 4,896,136 A | 1/1990 | Hotovy |
| 4,984,380 A | 1/1991 | Anderson |
| 5,003,486 A | 3/1991 | Hendel |
| 5,045,833 A | 9/1991 | Smith |
| 5,068,715 A | 11/1991 | Wade |
| 5,156,203 A | 10/1992 | Funakoshi |
| 5,159,315 A | 10/1992 | Schultz |
| 5,185,531 A | 2/1993 | Wynn |
| 5,307,051 A | 4/1994 | Sedlmayr |
| 5,426,501 A | 6/1995 | Hokanson |
| 5,478,256 A | 12/1995 | Koganemaru |
| 5,492,482 A | 2/1996 | Lockman |
| 5,493,618 A | 2/1996 | Stevens |
| 5,532,660 A | 7/1996 | Smith |
| 5,578,995 A | 11/1996 | Bryant |
| 5,646,591 A | 7/1997 | Issa |
| 5,675,070 A | 10/1997 | Gelperin |
| 5,745,670 A | 4/1998 | Linde |
| 5,801,297 A | 9/1998 | Mifsud |
| 5,855,494 A | 1/1999 | Blaszczyk et al. |
| 5,905,436 A | 5/1999 | Dwight et al. |
| 5,936,613 A | 8/1999 | Jaeger |
| 6,023,223 A | 2/2000 | Baxter |
| 6,023,233 A | 2/2000 | Craven |
| 6,074,089 A | 6/2000 | Hollander |
| 6,077,107 A | 6/2000 | Hetherington |
| 6,084,572 A | 7/2000 | Yaniger |
| 6,158,868 A | 12/2000 | Chien |
| 6,216,956 B1 | 4/2001 | Ehlers |
| 6,234,642 B1 | 5/2001 | Bokämper |
| 6,257,758 B1 | 7/2001 | Culbertson |
| 6,408,704 B1 | 6/2002 | Willeke |
| 6,415,205 B1 | 7/2002 | Myron |
| 6,428,334 B1 | 8/2002 | Skarie |
| 6,442,999 B1 | 9/2002 | Baumoel |
| 6,492,907 B1 | 12/2002 | Mccracken |
| 6,542,234 B1 | 4/2003 | Ulrich |
| 6,554,439 B1 | 4/2003 | Teicher |
| 6,615,147 B1 | 9/2003 | Jonker |
| 6,672,129 B1 | 1/2004 | Frederickson |
| 6,677,573 B1 | 1/2004 | Nakata |
| 6,741,177 B2 | 5/2004 | Ballantyne |
| 6,753,776 B2 | 6/2004 | Drinkard |
| 6,753,786 B1 | 6/2004 | Apperson |
| 6,759,763 B2 | 7/2004 | Barton |
| 6,772,052 B1 | 8/2004 | Amundsen |
| 6,828,909 B2 | 12/2004 | Script |
| 6,873,725 B2 | 3/2005 | Xu |
| 6,892,317 B1 | 5/2005 | Sampath et al. |
| 6,950,017 B2 | 9/2005 | Smith |
| 6,981,943 B2 | 1/2006 | Noguchi |
| 6,991,029 B2 | 1/2006 | Orfield |
| 7,038,398 B1 | 5/2006 | Lys |
| 7,049,968 B2 | 5/2006 | Fitzgerald |
| 7,089,780 B2 | 8/2006 | Sunshine |
| 7,098,782 B1 | 8/2006 | Peckham |
| 7,116,213 B2 | 10/2006 | Thiesen |
| 7,119,789 B1 | 10/2006 | Shaw |
| 7,155,317 B1 | 12/2006 | Tran |
| 7,166,796 B2 | 1/2007 | Nicolaou |
| 7,166,937 B2 | 1/2007 | Wilson |
| 7,227,652 B2 | 6/2007 | Cronch |
| 7,257,397 B2 | 8/2007 | Shamoon |
| 7,264,377 B2 | 9/2007 | Cooper |
| 7,287,738 B2 | 10/2007 | Pitlor |
| 7,304,129 B2 | 12/2007 | Saffell |
| 7,304,259 B2 | 12/2007 | Schwarz |
| 7,337,078 B2 | 2/2008 | Bond |
| RE40,437 E | 7/2008 | Rosen |
| 7,400,594 B2 | 7/2008 | Pereira |
| 7,405,524 B2 | 7/2008 | Null |
| 7,420,293 B2 | 9/2008 | Donnelly |
| 7,424,624 B2 | 9/2008 | Espinoza-Ibarra |
| 7,438,446 B1 | 10/2008 | Mccann |
| 7,492,273 B2 | 2/2009 | Sharpe |
| 7,502,199 B2 | 3/2009 | Hori |
| 7,515,041 B2 | 4/2009 | Eisold |
| 7,520,607 B2 | 4/2009 | Casper |
| 7,522,036 B1 | 4/2009 | Preuss |
| 7,649,472 B1 | 1/2010 | Paterno |
| 7,673,525 B2 | 3/2010 | Huang |
| 7,685,861 B2 | 3/2010 | Lynch |
| 7,710,824 B1 | 5/2010 | Katzer et al. |
| 7,764,180 B2 | 7/2010 | Huang |
| 7,784,293 B2 | 8/2010 | Violand |
| 7,786,879 B2 | 8/2010 | Lax |
| 7,818,184 B2 | 10/2010 | Penny |
| 7,825,546 B2 | 11/2010 | Li |
| 7,828,463 B1 | 11/2010 | Willis |
| 7,874,695 B2 | 1/2011 | Jensen |
| 7,905,154 B2 | 3/2011 | Jones |
| 7,952,475 B2 | 5/2011 | Ivanov |
| 7,963,177 B2 | 6/2011 | Gysling |
| 7,992,332 B2 | 8/2011 | Lowenthal |
| 7,994,928 B2 | 8/2011 | Richmond |
| 8,018,327 B2 | 9/2011 | Nelson |
| 8,051,312 B2 | 11/2011 | Foley |
| 8,097,984 B2 | 1/2012 | Baarman |
| 8,113,069 B2 | 2/2012 | Settles |
| 8,125,194 B2 | 2/2012 | Nethken |
| 8,155,012 B2 | 4/2012 | Austermann |
| 8,170,722 B1 | 5/2012 | Elberbaum |
| 8,224,576 B2 | 7/2012 | Jensen |
| 8,242,640 B2 | 8/2012 | Lee |
| 8,255,090 B2 | 8/2012 | Frader-Thompson |
| 8,289,135 B2 | 10/2012 | Griffin |
| 8,301,271 B2 | 10/2012 | Lee |
| 8,314,590 B2 | 11/2012 | Chen |
| 8,335,936 B2 | 12/2012 | Jonsson |
| 8,350,406 B2 | 1/2013 | Byrne et al. |
| 8,369,135 B1 | 2/2013 | Mani |
| 8,451,132 B1 | 5/2013 | Van Vleet |
| 8,463,452 B2 | 6/2013 | Masters |
| 8,466,626 B2 | 6/2013 | Null |
| 8,475,367 B1 | 7/2013 | Yuen |
| 8,489,437 B1 | 7/2013 | Dlott |
| 8,493,618 B2 | 7/2013 | Ishii |
| 8,523,758 B1 | 9/2013 | Kirby |
| 8,543,247 B2 | 9/2013 | Boss |
| 8,564,403 B2 | 10/2013 | Landau-Holdsworth |
| 8,583,843 B2 | 11/2013 | Rosso |
| 8,605,091 B2 | 12/2013 | Bradbury |
| 8,610,587 B2 | 12/2013 | Tropper |
| 8,636,271 B2 | 1/2014 | Check |
| 8,639,391 B1 | 1/2014 | Alberth |
| 8,683,236 B2 | 3/2014 | Ukita |
| 8,730,004 B2 | 5/2014 | Elfstrom et al. |
| 8,823,529 B2 | 9/2014 | Reed |
| 8,897,804 B2 | 11/2014 | Couch |
| 9,064,394 B1 | 6/2015 | Trundle |
| 2001/0007800 A1 | 7/2001 | Skarie |
| 2002/0011947 A1 | 1/2002 | Stolarczyk |
| 2002/0037026 A1 | 3/2002 | Sato |
| 2002/0050932 A1 | 5/2002 | Rhoades |
| 2002/0066019 A1* | 5/2002 | Amonou ............... G06T 1/0092 713/176 |
| 2002/0069076 A1 | 6/2002 | Faris |
| 2002/0073138 A1 | 6/2002 | Gilbert |
| 2002/0097546 A1 | 7/2002 | Weinberger |
| 2002/0152037 A1 | 10/2002 | Sunshine |
| 2002/0170367 A1 | 11/2002 | Lieber |
| 2003/0028270 A1 | 2/2003 | Peterson |
| 2003/0074092 A1 | 4/2003 | Carrabis |
| 2003/0194904 A1 | 10/2003 | Rupert et al. |
| 2003/0227220 A1 | 12/2003 | Biskup |

(56) References Cited

U.S. PATENT DOCUMENTS

| | | |
|---|---|---|
| 2003/0227389 A1 | 12/2003 | McGreal |
| 2003/0231495 A1 | 12/2003 | Searfoss |
| 2004/0015572 A1 | 1/2004 | Kang |
| 2004/0025604 A1 | 2/2004 | Call |
| 2004/0030531 A1 | 2/2004 | Miller |
| 2004/0069046 A1 | 4/2004 | Sunshine |
| 2004/0075566 A1 | 4/2004 | Stepanik |
| 2004/0147038 A1 | 7/2004 | Lewis |
| 2004/0158193 A1 | 8/2004 | Bui |
| 2004/0215981 A1 | 10/2004 | Ricciardi |
| 2005/0045784 A1 | 3/2005 | Pitlor |
| 2005/0073405 A1 | 4/2005 | Spoltore |
| 2005/0111213 A1 | 5/2005 | Smith |
| 2005/0136972 A1 | 6/2005 | Smith |
| 2005/0148890 A1 | 7/2005 | Hastings |
| 2005/0229452 A1 | 10/2005 | Shimasaki |
| 2005/0276051 A1 | 12/2005 | Caudle |
| 2005/0289378 A1 | 12/2005 | Vorenkamp |
| 2006/0004492 A1 | 1/2006 | Terlson |
| 2006/0119954 A1 | 6/2006 | Casper |
| 2006/0173580 A1 | 8/2006 | Desrochers |
| 2006/0236325 A1* | 10/2006 | Rao .................. G06F 8/65 719/315 |
| 2006/0238757 A1 | 10/2006 | Silcott |
| 2006/0250236 A1 | 11/2006 | Ackley |
| 2006/0250260 A1 | 11/2006 | Albert |
| 2007/0038334 A1 | 2/2007 | Chou |
| 2007/0061393 A1 | 3/2007 | Moore |
| 2007/0109121 A1 | 5/2007 | Cohen |
| 2007/0132558 A1 | 6/2007 | Rowe |
| 2007/0138307 A1 | 6/2007 | Khoo |
| 2007/0155349 A1 | 7/2007 | Nelson |
| 2007/0168088 A1 | 7/2007 | Ewing |
| 2007/0173978 A1 | 7/2007 | Fein |
| 2007/0182963 A1 | 8/2007 | Wright |
| 2007/0219650 A1 | 9/2007 | Wang et al. |
| 2007/0225868 A1 | 9/2007 | Terlson |
| 2007/0241615 A1 | 10/2007 | Goodrich |
| 2007/0268687 A1 | 11/2007 | Scannell |
| 2007/0276548 A1 | 11/2007 | Uzunovic |
| 2007/0278285 A1 | 12/2007 | Ehrensvaerd |
| 2008/0024089 A1 | 1/2008 | Meng |
| 2008/0096620 A1 | 4/2008 | Lee |
| 2008/0097809 A1 | 4/2008 | Stroman |
| 2008/0106424 A1 | 5/2008 | Bouse |
| 2008/0120296 A1 | 5/2008 | Kariathungal |
| 2008/0123332 A1 | 5/2008 | Searfoss |
| 2008/0143525 A1 | 6/2008 | Woodbury |
| 2008/0155429 A1 | 6/2008 | Frank et al. |
| 2008/0173817 A1 | 7/2008 | Goldstein |
| 2008/0204258 A1 | 8/2008 | Dayton |
| 2008/0211683 A1 | 9/2008 | Curt |
| 2008/0221714 A1 | 9/2008 | Schoettle |
| 2008/0279287 A1 | 11/2008 | Asahina |
| 2008/0291036 A1 | 11/2008 | Richmond |
| 2008/0303678 A1 | 12/2008 | Mccredy |
| 2009/0031786 A1 | 2/2009 | Takeuchi |
| 2009/0054799 A1 | 2/2009 | Vrtis |
| 2009/0065596 A1 | 3/2009 | Seem |
| 2009/0066513 A1 | 3/2009 | Kondo |
| 2009/0073694 A1 | 3/2009 | Scannell, Jr. |
| 2009/0096620 A1 | 4/2009 | Kuo |
| 2009/0105558 A1 | 4/2009 | Riley-Doucet |
| 2009/0140898 A1 | 6/2009 | Ceballos |
| 2009/0141898 A1 | 6/2009 | Huang |
| 2009/0154148 A1 | 6/2009 | Meyer |
| 2009/0157839 A1 | 6/2009 | Diederichs |
| 2009/0193578 A1 | 8/2009 | Jang |
| 2009/0195382 A1 | 8/2009 | Hall |
| 2009/0225480 A1 | 9/2009 | Baxter |
| 2009/0243597 A1 | 10/2009 | Spenik |
| 2009/0271013 A1 | 10/2009 | Chen |
| 2009/0278868 A1 | 11/2009 | Nakahira |
| 2009/0290156 A1 | 11/2009 | Popescu |
| 2009/0298957 A1 | 12/2009 | Gauthier |
| 2010/0025449 A1 | 2/2010 | Longobardi |
| 2010/0033329 A1 | 2/2010 | Davis |
| 2010/0070619 A1 | 3/2010 | Chaganti |
| 2010/0071008 A1 | 3/2010 | Hu |
| 2010/0076615 A1 | 3/2010 | Daniel |
| 2010/0090822 A1 | 4/2010 | Benson |
| 2010/0101264 A1 | 4/2010 | Nishino |
| 2010/0145543 A1 | 6/2010 | Middlemiss |
| 2010/0164742 A1 | 7/2010 | Anderson |
| 2010/0182201 A1 | 7/2010 | Graczyk |
| 2010/0201536 A1 | 8/2010 | Robertson et al. |
| 2010/0228819 A1 | 9/2010 | Wei |
| 2010/0235004 A1 | 9/2010 | Thind |
| 2010/0249955 A1 | 9/2010 | Sitton |
| 2010/0264871 A1 | 10/2010 | Matouka |
| 2010/0274367 A1 | 10/2010 | Kaufman |
| 2010/0296685 A1 | 11/2010 | Carle |
| 2010/0298742 A1 | 11/2010 | Perlman |
| 2010/0298957 A1 | 11/2010 | Sanchez Rocha |
| 2010/0306033 A1 | 12/2010 | Oved |
| 2010/0313748 A1 | 12/2010 | Schluter |
| 2010/0318236 A1 | 12/2010 | Kilborn |
| 2011/0007491 A1 | 1/2011 | Robinson |
| 2011/0025499 A1 | 2/2011 | Hoy |
| 2011/0027626 A1 | 2/2011 | Lattin |
| 2011/0082599 A1 | 4/2011 | Shinde |
| 2011/0093281 A1 | 4/2011 | Plummer |
| 2011/0095801 A1 | 4/2011 | Bjerregaard et al. |
| 2011/0108724 A1 | 5/2011 | Ewing |
| 2011/0185198 A1 | 7/2011 | Ukita |
| 2011/0187542 A1 | 8/2011 | Dittmer |
| 2011/0202193 A1 | 8/2011 | Craig |
| 2011/0216453 A1 | 9/2011 | Haines |
| 2011/0245988 A1 | 10/2011 | Ingels |
| 2011/0260851 A1 | 10/2011 | Richman |
| 2011/0270458 A1 | 11/2011 | Liu |
| 2011/0273283 A1 | 11/2011 | Schmuttor |
| 2011/0275960 A1 | 11/2011 | Westerink |
| 2011/0316355 A1 | 12/2011 | Gruber |
| 2012/0004871 A1 | 1/2012 | Tsao |
| 2012/0022886 A1 | 1/2012 | Ohnemus |
| 2012/0023555 A1 | 1/2012 | Putterman |
| 2012/0025221 A1 | 2/2012 | Sakumoto |
| 2012/0041917 A1 | 2/2012 | Newton |
| 2012/0051714 A1 | 3/2012 | Reimnitz |
| 2012/0082180 A1 | 4/2012 | Edwardson |
| 2012/0086402 A1 | 4/2012 | Carder |
| 2012/0087211 A1 | 4/2012 | Lee et al. |
| 2012/0095610 A1 | 4/2012 | Chapel |
| 2012/0098439 A1 | 4/2012 | Recker et al. |
| 2012/0109398 A1 | 5/2012 | Bhakta |
| 2012/0119714 A1 | 5/2012 | Jitaru |
| 2012/0130544 A1 | 5/2012 | Mohan |
| 2012/0154126 A1 | 6/2012 | Cohn |
| 2012/0161969 A1 | 6/2012 | Husen |
| 2012/0166642 A1 | 6/2012 | Saint Clair et al. |
| 2012/0194082 A1 | 8/2012 | Huang |
| 2012/0197196 A1 | 8/2012 | Halbert |
| 2012/0206050 A1 | 8/2012 | Spero |
| 2012/0209634 A1 | 8/2012 | Ling |
| 2012/0229248 A1 | 9/2012 | Parshionikar |
| 2012/0229278 A1 | 9/2012 | Roosli |
| 2012/0258800 A1 | 10/2012 | Mikhailov |
| 2012/0265361 A1 | 10/2012 | Billingsley |
| 2012/0268136 A1 | 10/2012 | Lee |
| 2012/0271471 A1 | 10/2012 | Lee |
| 2012/0278101 A1 | 11/2012 | Homchowdhury |
| 2012/0283860 A1 | 11/2012 | Ho |
| 2012/0288124 A1 | 11/2012 | Fejzo |
| 2012/0303554 A1 | 11/2012 | Osann |
| 2012/0314344 A1 | 12/2012 | Lam |
| 2012/0316661 A1 | 12/2012 | Rahman |
| 2012/0319593 A1 | 12/2012 | Jou |
| 2012/0325023 A1 | 12/2012 | Calio |
| 2013/0006436 A1 | 1/2013 | Masters |
| 2013/0013967 A1 | 1/2013 | Gokhale et al. |
| 2013/0021720 A1 | 1/2013 | Ty et al. |
| 2013/0024211 A1 | 1/2013 | Monteforte |
| 2013/0035599 A1 | 2/2013 | De Bruijn |

(56) References Cited

U.S. PATENT DOCUMENTS

| | | |
|---|---|---|
| 2013/0038470 A1 | 2/2013 | Niemeyer |
| 2013/0049466 A1 | 2/2013 | Adams |
| 2013/0049607 A1 | 2/2013 | Urata |
| 2013/0051543 A1 | 2/2013 | McDysan et al. |
| 2013/0058116 A1 | 3/2013 | Galbas |
| 2013/0082817 A1 | 4/2013 | Gruenbacher |
| 2013/0083805 A1 | 4/2013 | Lu |
| 2013/0085609 A1 | 4/2013 | Barker |
| 2013/0085615 A1 | 4/2013 | Barker |
| 2013/0107041 A1 | 5/2013 | Norem |
| 2013/0119891 A1 | 5/2013 | Herremans |
| 2013/0135214 A1 | 5/2013 | Li |
| 2013/0141233 A1 | 6/2013 | Jacobs et al. |
| 2013/0144644 A1 | 6/2013 | Simpson |
| 2013/0162821 A1 | 6/2013 | Park |
| 2013/0166089 A1 | 6/2013 | Craig |
| 2013/0174646 A1 | 7/2013 | Martin |
| 2013/0175132 A1 | 7/2013 | Battlogg |
| 2013/0184880 A1 | 7/2013 | Mcmahon |
| 2013/0200254 A1 | 8/2013 | Johnson |
| 2013/0201033 A1 | 8/2013 | Cohn |
| 2013/0234625 A1 | 9/2013 | Kondo |
| 2013/0238153 A1 | 9/2013 | Warwick |
| 2013/0264889 A1 | 10/2013 | Quittek |
| 2013/0271015 A1 | 10/2013 | Peng |
| 2013/0275148 A1 | 10/2013 | Attaluri |
| 2013/0289919 A1 | 10/2013 | Wilson |
| 2013/0338839 A1 | 12/2013 | Rogers |
| 2013/0339766 A1 | 12/2013 | Chen |
| 2014/0006506 A1 | 1/2014 | Frei |
| 2014/0025221 A1 | 1/2014 | Chapel |
| 2014/0028097 A1 | 1/2014 | Augur |
| 2014/0032003 A1 | 1/2014 | Chapel |
| 2014/0035749 A1 | 2/2014 | Reed |
| 2014/0046599 A1 | 2/2014 | Smith |
| 2014/0052300 A1 | 2/2014 | Matsuoka et al. |
| 2014/0069131 A1 | 3/2014 | Masui |
| 2014/0070959 A1 | 3/2014 | Bhargava et al. |
| 2014/0092765 A1 | 4/2014 | Agarwal |
| 2014/0098445 A1 | 4/2014 | Hooper |
| 2014/0099941 A1 | 4/2014 | Ji |
| 2014/0100700 A1 | 4/2014 | Matsumoto |
| 2014/0101346 A1 | 4/2014 | Naaman |
| 2014/0122140 A1 | 5/2014 | Rijnders et al. |
| 2014/0156084 A1 | 6/2014 | Rahman |
| 2014/0185646 A1 | 7/2014 | Mowry |
| 2014/0188286 A1 | 7/2014 | Hunka |
| 2014/0233186 A1 | 8/2014 | Savelli |
| 2014/0236372 A1 | 8/2014 | Ewing |
| 2014/0257572 A1 | 9/2014 | Mohan |
| 2014/0277869 A1 | 9/2014 | King |
| 2014/0281544 A1 | 9/2014 | Paczkowski |
| 2014/0283144 A1 | 9/2014 | Gettings |
| 2014/0340227 A1 | 11/2014 | Reed |
| 2014/0364089 A1* | 12/2014 | Lienhart ............... H04W 4/12 455/412.2 |
| 2015/0021465 A1 | 1/2015 | Gettings |

FOREIGN PATENT DOCUMENTS

| | | |
|---|---|---|
| WO | WO-0133178 | 5/2001 |
| WO | WO-2005063006 | 7/2005 |
| WO | WO-2007148299 | 12/2007 |

OTHER PUBLICATIONS

Baran, Paul, "Packet Switching", Fundamentals of Digital Switching, 2nd Ed., 1990, pp. 193-235.

Brown, Rick, "Nest pulls Protect Smoke Detector from Retail on Safety Issue", CNET. Retrieved from the Internet: <www.cnet.com/news/nest-pulls-protect-smoke-detector-from-retail-on-safety-issue>, accessed on Nov. 3, 2014, 3 pgs.

Carriazo-Osorio, Fernando, "Impacts of Air Pollution on Property Values: An Economic Valuation for Bogota, Columbia", Retrieved from the Internet: <http://www.demogr.mpg.de/papers/workshops/010518_paper02.pdf>, published on Aug. 19, 2007, 16 pgs.

"Chapter Five—Global Positioning System", Global Positioning System. Retrieved from the Internet: <http://www.academia.edu/6330277/Chapter_5_Global_Positioning_System>, pp. 5.1-5.14.

Fadell, Tony. "Consumer Safety Notice for Nest Protect: Smoke + CO Alarm". Retrieved from the Internet: <Nest.com/letter-from-the-ceo>, published on Apr. 3, 2014, 3 pgs.

Dandamudi, Sivarama, "Interrupts", Fundamentals of Computer Organization and Design, Sep. 22, 2001, pp. 825-862.

Dijkman, Greg, "Scientific Gel and Blot Imaging: The difference between resolution and sensitivity with CCD cameras." Retrieved from the Internet: <gregdijkman.com/ccd-camera-imaging-sensitivity-resolution>, accessed on Nov. 5, 2014, 2 pgs.

"For $129, the best smoke detector on the market", CNET. Retrieved from the Internet: <http://www.cnet.com/products/nest-protect>, accessed on Jul. 8, 2014, 4 pgs.

Frederiksen, Rikard, "The optical sensitivity of compound eyes: theory and experiment compared", Bio. Lett., vol. 4, No. 6, Dec. 23, 2008, pp. 745-747.

"Guidance Regarding Methods for De-identification of Protected Health Information in Accordance with the Health Insurance Portability Act (HIPAA) Privacy Rule", Department of Health and Human Services. Retrieved from the Internet: <http://www.hhs.gov/ocr/privacy/hippa/understanding/coveredentities/De-identification/guidance.html>, accessed on Dec. 4, 2014, 18 pgs.

Hayashi, et al., "A Network-Centric approach to Sensor-data and Service Integration", SICE Annual Conference 2011, Sep. 13, 2011, pp. 2037-2042.

Huang, et al., "Pervasive, Secure Access to a Hierarchical Sensor-Based Healthcare Monitoring Architecture in Wireless Heterogeneous Networks", IEEE Journal on Selected Areas in Communication, vol. 27, No. 4, May 2009, pp. 400-411.

Mainwaring, "Wireless Sensor Networks for Habitat Monitoring", WNSA '02, Sep. 28, 2002, pp. 88-97.

McCracken, Harry, "Nest's Smoke Detector Recall; Doesn't Mean You Need to Send Yours Back", Retrieved from the Internet: <http://time.com/108171/nest-recall/>, published on May 21, 2014, 2 pgs.

Miyaho, et al. "Sensor Network Management for Healthcare applications", 2010 Fifth International Conference on Systems and Networks Communications, 2010, pp. 14-20.

Moffat, "Notes on Using Thermocouples". Retrieved from the Internet: <http://www.electronics-cooling.com/1197/01/notes-on-using-thermocouples/>, accessed on Nov. 6, 2014, pp. 1-9.

Mogg, Trevor, "Nest Recall 440,000 Protect Smoke alarms, Issues Software Update that fixes Glitch". Retrieved from the Internet: <http://www.digitaltrends.com/home/nest-halts-sales-of-nest-protect-smoke-alarm/>, published on May 21, 2014, 5 pgs.

"Nest Labs Recall to Repair Nest Protect Smoke + CO Alarms Due to Failure to Sound Alert". Retrieved from the Internet: <http://www.cpsc/gov/en/Recalls/2014/Nest-Labs-Recalls-to-Repair-Nest-protect-Smoke-CO-Alarms>, published on May 21, 2014, 3 pgs.

"Nest Protect", Manual, Oct. 2013, 2 pgs.

Noh, Sun-Kuh et al. "Design of a Room Monitoring System for Wireless Sensor Networks", Intl. Journal of Distributed Sensor Networks, vol. 2013, Article ID 189840, 2013, 7 pages.

"Optical Resolution .". Retrieved from the Internet: <en.wikepedia.org/wiki.Optical_resolution>, accessed on Nov. 5, 2014, 11 pgs.

"Privacy Protector:6 Good Reasons to De-Indentify Data". Retrieved from the Internet: <http://privacyguidance.com/blog/6-good-reasons-to-de-identify-data>, accessed on Dec. 8, 2014, 6 pgs.

"Resolution and Sensitivity". Retrieved from the Internet: <www.atnf.csiro.au/outreach/education/senior/astrophysics/resolution_sensitivity.html>, accessed on Nov. 5, 2014, 5 pgs.

Steenerson, Christopher E, "Education in Microscopy and Digital Imaging". Retrieved from the Internet: <zeiss-campus.magnets.fsu.edu/tutorials/basics/spatialfrequency/indexfalsh.html>, accessed on Nov. 5, 2014, 2 pgs.

"Symptom—Definition by Merriam-Webster", Retrieved from the Internet: <http://www.merriam-webster.com/medical/symptom/>, accessed on Dec. 4, 2014, 3 pgs.

(56) References Cited

OTHER PUBLICATIONS

"Tutorial on Spatial Frequency Analysis". Retrieved from the Internet: <www.psy.vanderbilt.edu/courses/hon185/SpatialFrequency/SpatialFrequency.html>, accessed on Nov. 5, 2014, 10 pgs.
"What is Nest Wave and how does it work?". Retrieved from the Internet: <support/nest.com/article/what-is-nest-wave-and-how-does-it-work>, accessed on Nov. 5, 2014, 3 pgs.
Yildiz, "Potential ambient Energy-Harvesting Sources and Techniques", The Journal of Technology Studies, vol. 35, No. 1. Fall 2009, pp. 1-14. Retrieved from the Internet: <http://scholar.lib.vt.edu/ejournals/JOTS/v35l v35n1/yidliz.html>, accessed on Jan. 27, 2015.
U.S. Appl. No. 14/263,616, filed Apr. 28, 2014.
U.S. Appl. No. 14/263,668, filed Apr. 28, 2014.
U.S. Appl. No. 14/263,721, filed Apr. 28, 2014.
U.S. Appl. No. 14/283,075, filed May 20, 2014.
U.S. Appl. No. 14/640,738, filed Mar. 6, 2015.
U.S. Appl. No. 14/283,079, filed May 20, 2014.
U.S. Appl. No. 14/283,084, filed May 20, 2014.
U.S. Appl. No. 14/283,086, filed May 20, 2014.
U.S. Appl. No. 14/283,035, filed May 20, 2014.
U.S. Appl. No. 14/283,057, filed May 20, 2014.
U.S. Appl. No. 14/283,080, filed May 20, 2014.
U.S. Appl. No. 14/752,634, filed Jun. 26, 2015.
U.S. Appl. No. 14/283,097, filed May 20, 2014.
U.S. Appl. No. 14/316,446, filed Jun. 26, 2014.
U.S. Appl. No. 14/263,769, filed Apr. 28, 2014.
U.S. Appl. No. 14/263,802, filed Apr. 28, 2014.
U.S. Appl. No. 14/742,668, filed Jun. 17, 2015.
U.S. Appl. No. 14/263,838, filed Apr. 28, 2014.
U.S. Appl. No. 14/263,875, filed Apr. 28, 2014.
U.S. Appl. No. 14/263,899, filed Apr. 28, 2014.
U.S. Appl. No. 14/263,920, filed Apr. 28, 2014.
U.S. Appl. No. 14/535,249, filed Nov. 6, 2014.
U.S. Appl. No. 14/334,533, filed Jul. 17, 2014.
U.S. Appl. No. 14/334,550, filed Jul. 17, 2014.
U.S. Appl. No. 14/732,681, filed Jun. 6, 2015.
U.S. Appl. No. 14/334,567, filed Jul. 17, 2014.
U.S. Appl. No. 14/334,583, filed Jul. 17, 2014.
U.S. Appl. No. 14/334,598, filed Jul. 17, 2014.
U.S. Appl. No. 14/334,616, filed Jul. 17, 2014.
U.S. Appl. No. 14/448,849, filed Jul. 31, 2015.
U.S. Appl. No. 14/732,684, filed Jun. 6, 2015.
U.S. Appl. No. 14/467,872, filed Aug. 25, 2014.
U.S. Appl. No. 14/470,525, filed Aug. 27, 2014.
U.S. Appl. No. 14/470,753, filed Aug. 27, 2014.
U.S. Appl. No. 14/470,774, filed Aug. 27, 2014.
U.S. Appl. No. 14/732,683, filed Jun. 6, 2015.
U.S. Appl. No. 14/480,307, filed Sep. 8, 2014.
U.S. Appl. No. 14/848,195, filed Sep. 8, 2015.
U.S. Appl. No. 14/701,399, filed Apr. 30, 2015.
U.S. Appl. No. 14/701,410, filed Apr. 30, 2015.
U.S. Appl. No. 14/701,421, filed Apr. 30, 2015.
U.S. Appl. No. 14/701,435, filed Apr. 30, 2015.
U.S. Appl. No. 14/701,439, filed Apr. 30, 2015.
U.S. Appl. No. 14/701,445, filed Apr. 30, 2015.
U.S. Appl. No. 14/701,450, filed Apr. 30, 2015.
U.S. Appl. No. 14/701,451, filed Apr. 30, 2015.

* cited by examiner

COMMUNICATING ARBITRARY ATTRIBUTES USING A PREDEFINED CHARACTERISTIC

BACKGROUND

1. Field

The described embodiments relate to techniques for communicating information in a wireless network. In particular, the described embodiments relate to techniques for communicating an arbitrary attribute type using a predefined characteristic having a numerical identifier.

2. Related Art

Wireless communication is an increasingly popular technology for communicating information between electronic devices. In particular, these electronic devices may include networking subsystem that implement a network interface for a wireless local area network such as: a wireless network described in the Institute of Electrical and Electronics Engineers (IEEE) 802.11 standard, Bluetooth® (from the Bluetooth Special Interest Group of Kirkland, Wash.), and/or another type of wireless network.

However, while these specifications facilitate communication between electronic devices, they are often inflexible. This can make it difficult for electronic devices to communicate with each other.

Using Bluetooth Low Energy as an illustration, characteristics (which are sometimes referred to as 'attribute types') can be defined to allow associated logical values to be communicated between electronic devices. Thus, a heart-rate monitor may have predefined characteristics for the heart rate of a user or the remaining battery life. When one of these predefined characteristics is invoked in message received by the heart-rate monitor, the heart-rate monitor may return a corresponding message with a current value of the heart rate or the remaining battery life. However, if the desired attributes types are not known in advance, it can be difficult to use characteristics to communicate information between electronic devices. This inflexibility may make it difficult for users to perform basic tasks, which may reduce user satisfaction.

SUMMARY

The described embodiments relate to an electronic device. This electronic device includes: an antenna; and an interface circuit, coupled to the antenna, which communicates with another electronic device using a Bluetooth Low Energy (BTLE) communication protocol. During operation the electronic device receives input messages using a predefined characteristic having a numerical identifier to convey input information associated with a set of input attribute types. A given input message includes one or more input-command characters specifying a given input attribute type in the set of input attribute types and, when the given input message includes an input value in an input argument associated with the given input attribute type, the given input message includes an input delimiter between the one or more input-command characters and the input argument. Moreover, the electronic device provides output messages using the predefined characteristic to convey output information associated with a set of output attribute types. A given output message includes one or more output-command characters specifying a given output attribute type in the set of output attribute types and, when the given output message includes an output value in an output argument associated with the given output attribute type, the given output message includes an output delimiter between the one or more output-command characters and the output argument.

Note that the input delimiter may include: a tab, and an ASCII delimiter. Moreover, the input delimiter may include an invalid character for a Service Set Identifier. Furthermore, the output delimiter may include a space or a comma.

Additionally, a maximum length of the given output message may be less than a maximum length of the given input message. For example, the maximum length of the given output message may be less than or equal to 22 characters, while the maximum length of the given input message may be much larger.

In some embodiments, when the electronic device receives an input message with an information request, the electronic device asynchronously provides one or more output messages with the requested information. In particular, the one or more output messages may be provided over time without the electronic device receiving further input messages related to the information request from the other electronic device.

Moreover, when the electronic device receives an input message with an information request and the requested information exceeds a maximum length of the given output message, the electronic device may provide the requested information in a set of output messages. A first output message in the set of output messages may specify a number of output messages in the set of output messages. Furthermore, output messages between the first output message and a final output message in the set of output messages may specify its position in the set of output messages and may include a portion of the requested information. Additionally, the final output message in the set of output messages may indicate that the set of output messages is complete.

Another embodiment provides a computer-program product for use in conjunction with the electronic device. This computer-program product may include instructions for at least some of the aforementioned operations performed by the electronic device.

Another embodiment provides a method for communicating the input messages and the output messages with the other electronic device using the BTLE communication protocol. This method may include at least some of the aforementioned operations performed by the electronic device.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Table 1 provides input messages communicated among at least some of the electronic devices of FIG. 1 in accordance with an embodiment of the present disclosure.

Table 2 provides output messages communicated among at least some of the electronic devices of FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

An electronic device that communicates input messages and output messages with another electronic device using a Bluetooth Low Energy (BTLE) communication protocol is described. In particular, the electronic device receives input messages using a predefined characteristic having a numerical identifier to convey input information associated with a set of input attribute types. A given input message includes one or more input-command characters specifying a given input attribute type in the set of input attribute types and, optionally, an input delimiter and an input value in an input argument associated with the given input attribute type. Moreover, the electronic device provides output messages using the predefined characteristic to convey output information associated with a set of output attribute types. A given output message includes one or more output-command characters specifying a given output attribute type in the set of output attribute types and, optionally, an output delimiter and an output value in an output argument associated with the given output attribute type.

In this way, the electronic device may repurpose the predefined characteristic to allow information associated with an arbitrary attribute type (or command) to be communicated between the electronic device and the other electronic device. This flexibility may allow the BTLE communication protocol to be used even when the desired attributes types are not known in advance. Consequently, this communication protocol may allow users of the electronic device to perform basic tasks and a wide range of applications, which may increase user satisfaction with the electronic device.

In the discussion that follows the input packets and the output packets may be transmitted and received by electronic devices using radios that communicate packets in accordance with a wireless-local-area-network (WLAN) communication protocol, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), and/or another type of wireless interface. In the discussion that follows, BTLE is used as an illustrative example. However, a wide variety of communication protocols may be used.

Figure 1:
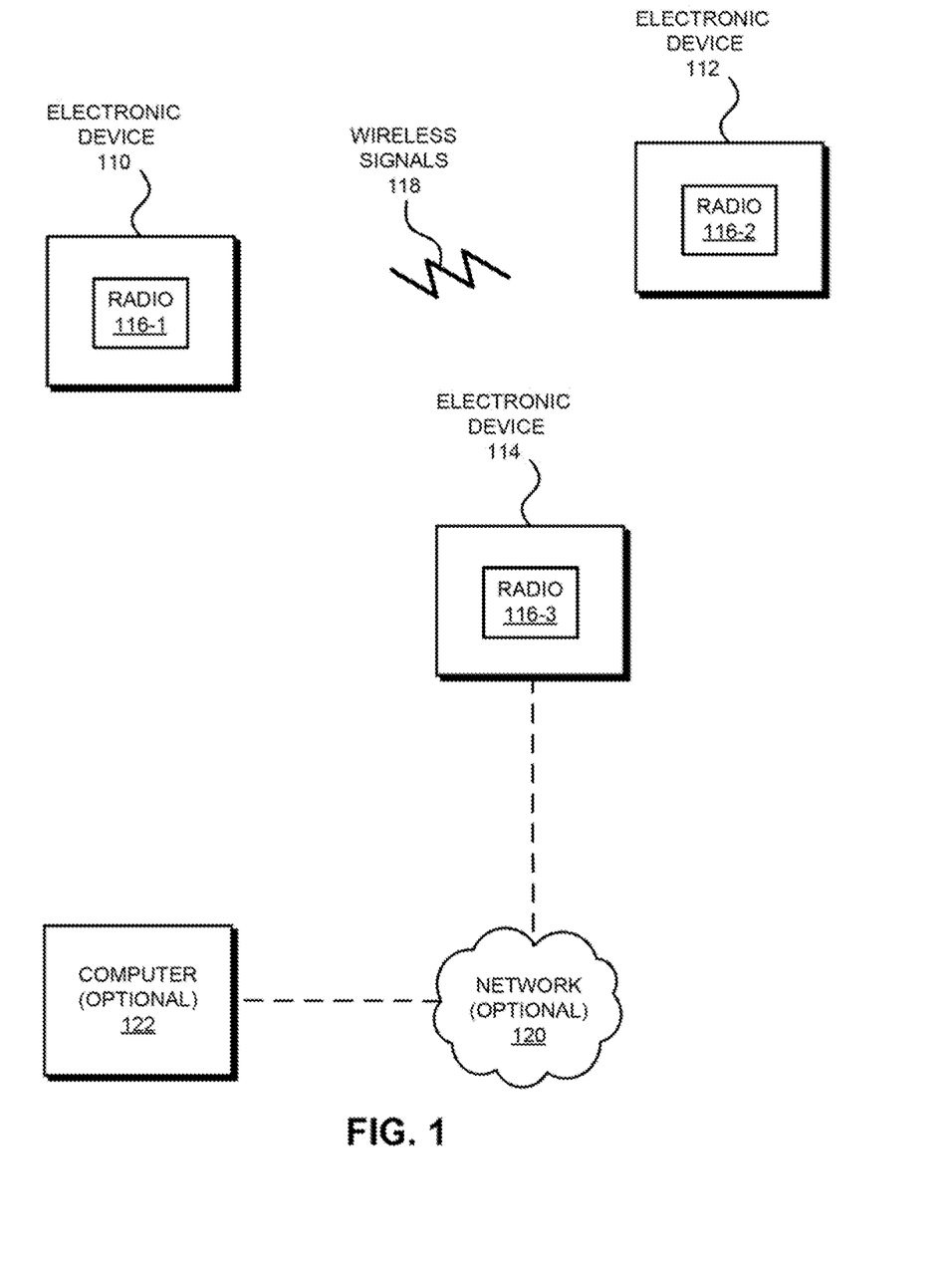
FIG. 1 is a block diagram illustrating electronic devices communicating in accordance with an embodiment of the present disclosure.

Communication among electronic devices is shown in FIG. 1, which presents a block diagram illustrating, which presents a block diagram illustrating communication among electronic device 110, electronic device 112 and electronic device 114 (either of which may be another instance of electronic device 110, a legacy electronic device that does not communicate wirelessly or electrically with electronic device 110, an access point, or a portable electronic device, e.g., a cellular telephone), and with optional computer 122 via optional network 120 (such as the Internet, a wireless local area network, an Ethernet network, an intra-net, an optical network, etc.). In particular, electronic devices 110, 112 and/or 114 may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

As described further below with reference to FIG. 5, electronic devices 110, 112 and/or 114 may include subsystems, such as: a networking subsystem, a memory subsystem and a processor subsystem. In addition, electronic devices 110, 112 and/or 114 may include radios 116 in the networking subsystems. More generally, electronic devices 110, 112 and/or 114 can include (or can be included within) any electronic devices with the networking subsystems that enable these electronic devices to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 118 (represented by a jagged line) are transmitted from a radio 114-1 in electronic device 110. These wireless signals are received by at least one of electronic devices 112 and/or 114 (such as electronic device 112). In particular, electronic device 110 may transmit messages or packets. In turn, these packets may be received by radio 116-2 in electronic device 112. This may allow electronic device 110 to communicate information to electronic device 112. While FIG. 1 illustrates electronic device 110 transmitting packets, note that electronic device 110 may also receive packets from electronic devices 112 and/or 114.

In the described embodiments, processing of a packet or frame in electronic devices 110, 112 and/or 114 includes: receiving wireless signals 118 with the packet or frame; decoding/extracting the packet or frame from received wireless signals 118 to acquire the packet or frame; and processing the packet or frame to determine information contained in the packet or frame (such as the information included in the payload). For example, the information may include an output message from electronic device 112. Note that the communication between electronic device 110 and a given one of electronic devices 112 and 114 (such as electronic device 112) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization').

Electronic device 110 may use predefined characteristics (or attributes types) having associated numerical identifiers to communicate information, such as commands and/or associated values of arguments with electronic devices 112 and/or 114. However, when the desired characteristics are not known in advance or need to be modified, the communication technique may be used to dynamically repurpose a predefined characteristic. As described further below with reference to FIGS. 2-4, in order to address this challenge electronic device 110 (as well as electronic devices 112 and/or 114) may receive input messages using a predefined characteristic having a numerical identifier (such as a universally unique identifier) to convey input information associated with a set of input attribute types. A given input message may include one or more input-command characters specifying a given input attribute type in the set of input attribute types and, when the given input message includes an input value in an input argument associated with the given input attribute type, the given input message may include an input delimiter between the one or more input-command characters and the input argument. Note that the input delimiter may include: a tab, and an ASCII delimiter (such as: ASCII number 28, 29, 30 or 31). Moreover, the input delimiter may include an invalid character for a Wi-Fi Service Set Identifier. Thus, by using key-value pairs (i.e., the command characters and the optional arguments) electronic device 110 may communicate an arbitrary attribute type using the predefined characteristic.

Moreover, electronic device 110 may provide output messages using the predefined characteristic to convey output information associated with a set of output attribute types. A given output message may include one or more output-command characters specifying a given output attribute type in the set of output attribute types and, when the given output message includes an output value in an output argument associated with the given output attribute type, the given output message may include an output delimiter (such as a space or a comma) between the one or more output-command characters and the output argument.

In general, there may be constraints on the length of the output messages. Consequently, a maximum length of the given output message may be less than a maximum length of the given input message. For example, the maximum length of the given output message may be less than or equal to 22 characters, while the maximum length of the given input message may be much larger.

In some embodiments, when electronic device 110 receives an input message with an information request, electronic device 110 asynchronously provides one or more output messages with the requested information. In particular, the one or more output messages may be provided over time without electronic device 110 receiving further input messages related to the information request from electronic device 112. Thus, electronic device 112 may subscribe to a channel associated with electronic device 110. Then, after providing the information request, electronic device 112 may receive the one or more output messages from electronic device 110 as the requested information becomes available and/or when values in the attributes change. Consequently, the communication technique may allow electronic device 110 to implement a wireless serial port to electronic device 112.

Furthermore, with certain operating systems (such as Android from Google, Inc. of Mountain View, Calif.) the maximum length of the output messages may be addressed by transmitting multiple output messages to communicate the requested information while still being compliant with a BTLE specification or standard. For example, when electronic device 110 receives an input message with an information request and the requested information exceeds a maximum length of the given output message, electronic device 110 may provide the requested information in a set of output messages. A first output message in the set of output messages may specify a number of output messages in the set of output messages. Furthermore, output messages between the first output message and a final output message in the set of output messages may specify its position in the set of output messages and may include a portion of the requested information. Additionally, the final output message in the set of output messages may indicate that the set of output messages is complete. This information may allow electronic device 112 to process the set of output messages to extract the requested information.

Although we describe the network environment shown in FIG. 1 as an example, in alternative embodiments, different numbers or types of electronic devices may be present. For example, some embodiments comprise more or fewer electronic devices. As another example, in another embodiment different electronic devices are transmitting and/or receiving packets or frames.

Figure 2:
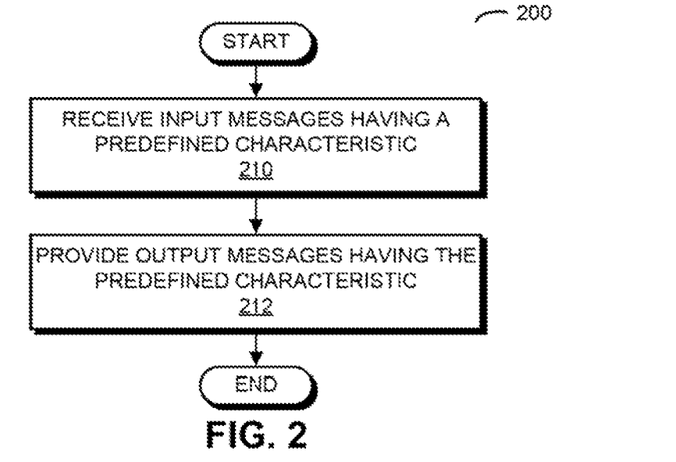
FIG. 2 is a flow diagram illustrating a method for communicating input messages and output messages among at least some of the electronic devices of FIG. 1 using a Bluetooth Low Energy (BTLE) communication protocol in accordance with an embodiment of the present disclosure.

We now further describe the communication technique. FIG. 2 presents embodiments of a flow diagram illustrating method 200 for communicating input messages and output messages with another electronic device using a BTLE communication protocol, which may be performed by an electronic device, such as one of electronic devices 110, 112 and 114 (FIG. 1). During operation, the electronic device receives the input messages using a predefined characteristic (operation 210) having a numerical identifier to convey input information associated with a set of input attribute types. A given input message includes one or more input-command characters specifying a given input attribute type in the set of input attribute types and, when the given input message includes an input value in an input argument associated with the given input attribute type, the given input message includes an input delimiter between the one or more input-command characters and the input argument.

Moreover, the electronic device provides the output messages using the predefined characteristic (operation 212) to convey output information associated with a set of output attribute types. A given output message includes one or more output-command characters specifying a given output attribute type in the set of output attribute types and, when the given output message includes an output value in an output argument associated with the given output attribute type, the given output message includes an output delimiter between the one or more output-command characters and the output argument.

Note that the electronic device may asynchronously provide (operation 212), in response to receiving an input message with an information request, one or more output messages with the requested information. These one or more output messages may be provided over time without the electronic device receiving further input messages related to the information request from the other electronic device.

Furthermore, when the electronic device receives an input message with an information request and the requested information exceeds a maximum length of the given output message, the electronic device may provide the requested information in a set of output messages. A first output message in the set of output messages may specify a number of output messages in the set of output messages. Output messages between the first output message and a final output message in the set of output messages may specify its position in the set of output messages and may include a portion of the requested information. Additionally, the final output message in the set of output messages may indicate that the set of output messages is complete.

In these ways, the electronic device (for example, an interface circuit, a driver and/or software executed in an environment of the transmitting electronic device) may facilitate communication with the other electronic device. In particular, the electronic device may dynamically repurpose a predefined BTLE characteristic so an arbitrary attribute type (and, optionally, a value of an argument associated with the arbitrary attribute type) can be received or transmitted to one of electronic devices 12 and/or 114 using the predefined BTLE characteristic. This capability may allow additional tasks, services and applications to be flexibly implemented using electronic device 110. For example, services may be offered to: users associated with electronic devices 110, 112 and/or 114 (such as owners or renters of these electronic devices), suppliers of components or spare parts, maintenance personnel, security personnel, emergency service personnel, insurance companies, insurance brokers, realtors, leasing agents, apartment renters, hotel guests, hotels, restaurants, businesses, organizations, governments, potential buyers of physical objects, a shipping or transportation company, etc. In particular, the input messages and the output messages may allow electronic device 110 to monitor an environmental condition in an environment that includes electronic device 110. This monitoring may allow electronic device 110 to adapt or change the function or operation of one or more electronic devices in FIG. 1 (such as a legacy electronic device and/or a regulator device, which may not directly communicate information with electronic device 110) based on the needs or preferences of a user associated with electronic device 110, who is, therefore, in proximity. In this way, an environmental condition (such as the temperature, humidity, an illumination pattern, etc.) in the environment may be dynamically modified. In addition, once the information associated with electronic device 110 is known, the service(s) may include maintenance notifications about electronic devices 110, 112 and/or 114. For example, electronic device 110 may include one or more sensors that monitor the environmental condition in the environment (such as an acoustic signal from a fire or carbon-monoxide detector that indicates a failing battery). Based on the environmental condition, electronic device 110 may provide a maintenance notification to a user's cellular telephone to replace the battery or to perform another remedial action (such as a repair or service to be performed on electronic device 112). Consequently, the improved functionality and services facilitated by the communication technique may promote sales of electronic device 110 (and, more generally, commercial activity) and may enhance customer satisfaction with electronic device 110.

In some embodiments of method 200 (FIG. 2), there may be additional or fewer operations. Moreover, the order of the operations may be changed, and/or two or more operations may be combined into a single operation.

Figure 3:
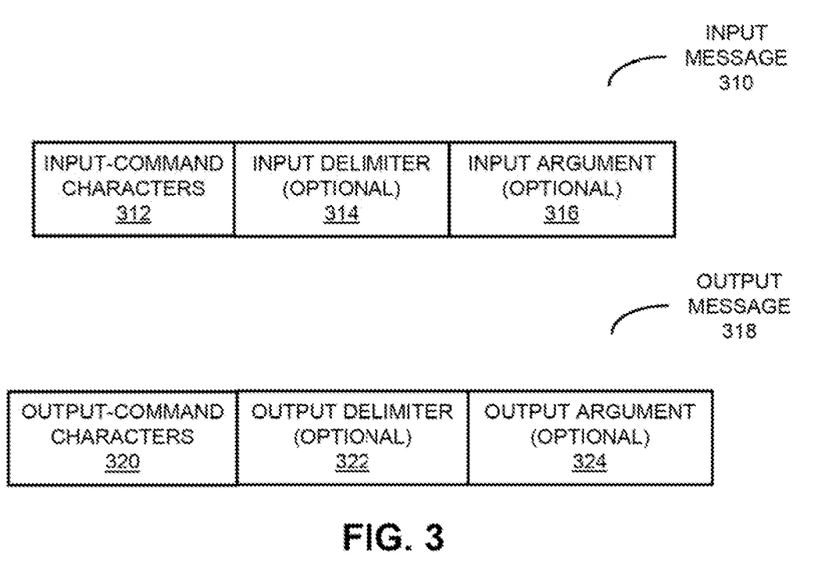
FIG. 3 is a block diagram illustrating an input message associated with a predefined characteristic and an output message associated with the predefined characteristic communicated among at least some of the electronic devices of FIG. 1 in accordance with an embodiment of the present disclosure.

In an exemplary embodiment, as shown in FIG. 3, which presents a drawing illustrating an input message 310 using a predefined characteristic having a numerical identifier and an output message 318 using the predefined characteristic communicated among electronic devices 110, 112 and/or 114 (FIG. 1). In particular, input message 310 may include one or more input-command characters 312 specifying a given input attribute type in a set of input attribute types (which are sometimes referred to as 'commands' or 'input commands'). Moreover, when input message 310 includes an input value in an optional input argument 316 associated with the given input attribute type, input message 310 includes an optional input delimiter 314 between the one or more input-command characters 312 and the optional input argument 316 (such as a tab or an ASCII delimiter). This information allows the predefined characteristic to be repurposed to convey any of the set of input attribute types. Table 1 presents examples of input messages communicated among at least some of electronic devices 110, 112 and/or 114 of FIG. 1. Note that the quotation marks are included for clarity. They are not included in the input messages.

TABLE 1

| Input Command | Command | Argument | Example |
|---|---|---|---|
| Set the Service Set Identifier (SSID) | S | SSID | "S family_wireless_net" |
| Set the password | P | Password | "P johnsons" |
| Set Wi-Fi secure | X | Yes or No | "X Yes" |
| Tell the electronic device that the network configuration is complete. This also causes network services to be restarted | NetworkConfigCompleted | None | "NetworkConfigCompleted" |
| Tells the electronic device that everything is done | ConfigCompleted | None | "ConfigCompleted" |
| Request serial number | ReqSerialNumber | None | "ReqSerial Number" |
| Request Wi-Fi connection status | ReqWifiStatus | None | "ReqWifiStatus" |
| Request version number | ReqBLEAPIVersion | None | "ReqBLEAPIVersion" |
| Request a scan of Wi-Fi electronic devices | ReqWiFiScan | None | "ReqWiFiScan" |
| Set PubNub channel | B | Pubnub channel | "B <pubnub channel>" |
| Set the electronic device token | T | Device token | "T <device token>" |

TABLE 1-continued

| Input Command | Command | Argument | Example |
|---|---|---|---|
| Request the electronic device type | ReqDeviceType | None | "ReqDevType" |
| Send pubnub channel key | PK | Pubnub publish key | "PK <pubnub publish key>" |
| Send pubnub subscriber key | SK | Pubnub subscriber key | "SK <pubnub subscriber key>" |
| Tell the electronic device the configuration is completed | ConfigCompleted | None | "ConfigCompleted" |
| Set timezone | TZ | Hours offset from Coordinated Universal time | "TZ-6" |
| Set the electronic device number | DN | Electronic device number | "TZ 3" |

Furthermore, output message 318 may include one or more output-command characters 320 specifying a given output attribute type in a set of output attribute types (which are sometimes referred to as 'commands' or 'output commands'). Additionally, when output message 318 includes an output value in an optional output argument 324 associated with the given output attribute type, output message 318 includes an optional output delimiter 322 between the one or more output-command characters 320 and the optional output argument 324 (such as a space or a comma). This information allows the predefined characteristic to be repurposed to convey any of the set of output attribute types. Table 2 presents examples of output messages communicated among at least some of electronic devices 110, 112 and/or 114 of FIG. 1. Note that the quotation marks are included for clarity. They are not included in the output messages. Because of constraints of the maximum length of the output message, requested information may be split into multiple messages. For example, in response to a request for a scan of Wi-Fi devices, the electronic device may respond with "AP 165,11," i.e., the first detected Wi-Fi electronic device is 165 and 11 more output messages will follow. Subsequent output messages may indicate the message number and another detected Wi-Fi electronic device, such as "L02 ATT808." Finally, the last output message in this set of output messages may indicate that the set is complete, such as "EAP."

TABLE 2

| Output Command | Command | Argument | Example |
|---|---|---|---|
| Serial number | N | Serial number | "N <serial number>" |
| Wi-Fi Connection Status | WS | Connected or Not connected | "WS connected" |
| BTLE Application Programming Interface Version | BLEAPIER | 1 | "BLEAPIVER 1" |
| Begin sending APs | AP | AP value, number of messages | "AP 165, 11" |
| AP message | L<message number> | AP value or identifier | "L02 ATT808" |
| End sending AP | EAP | None | "EAP" |
| Electronic device type | DT | Electronic device type | "DT <device type>" |

In an exemplary embodiment, a service associated with the electronic device (to which the other electronic device can subscribe) has a universally unique identifier such as 00000000000010008000000805F9B0000, and includes or is associated with the predefined characteristic that has a numerical identifier such as a universally unique identifier of 00000000000010008000000805F9B0001. This service allows this predefined characteristic to emulate a serial port between the electronic device and the other electronic device, such as a user's cellular telephone. In order to receive output messages from the electronic device, the other electronic device may subscribe to be notified when a value of one of the output attribute types changes. This allows the other electronic device to request information from the electronic device and to have the requested information sent back asynchronously by the electronic device without the other electronic device having to poll the electronic device. Note that, by default, when the predefined characteristic is read, the value return in the output argument may be the serial number of the electronic device.

As shown in FIG. 3, the general format of an input message to the electronic device may be:

<Command><Tab><Argument>.

A tab may be used as optional input delimiter 314 because it is not a valid character for a Service Set Identifier. Note that all the data sent to the electronic devices in input messages and received from the electronic device in output messages may be ASCII encoded. Moreover, while the number of characters that may be allowed to be sent to the electronic device from the other electronic device may be relatively large, the maximum size or length of an output message sent from the electronic device to the other electronic device may be 22 characters.

Figure 4:
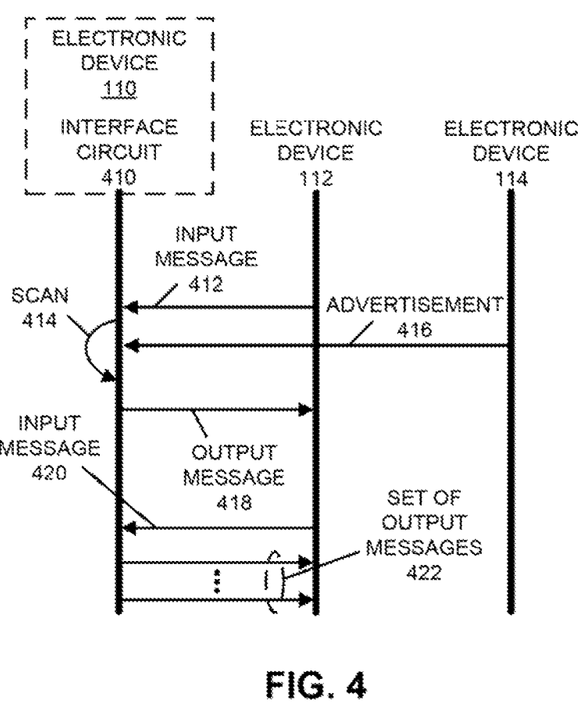
FIG. 4 is a drawing illustrating communication among at least some of the electronic devices of FIG. 1 in accordance with an embodiment of the present disclosure.

Embodiments of the communication technique are further illustrated in FIG. 4, which presents a drawing illustrating communication between electronic device 110 and electronic device 112 (FIG. 1). In particular, interface circuit 410 receives an input message 412 using a predefined characteristic having a numerical identifier from electronic device 112. This input message may include one or more input-command characters specifying a given input attribute type in a set of input attribute types. Moreover, when electronic device 112 writes information to electronic device 110 (i.e., when the given input message includes an input value in an input argument associated with the given input attribute type), the given input message includes an input delimiter (such as a tab) between the one or more input-command characters and the input argument. For example, the one or more input-command characters may request that electronic device 110 characterize a wireless-network environment, such as information about other electronic devices in a wireless network that includes electronic device 110.

In response, interface circuit 410 may characterize the other electronic devices in a wireless network by scanning 414 for advertisements (such as advertisement 416) from the other electronic devices in a wireless network. As other electronic devices (such as electronic device 114) are detected, interface circuit 410 may asynchronously provide an output message 418 using the predefined characteristic to electronic device 112. This output message may include one or more output-command characters specifying a given output attribute type in a set of output attribute types. Furthermore, when the given output message includes an output value in an output argument associated with the given output attribute type, the given output message may include an output delimiter (such as a comma) between the one or more output-command characters and the output argument.

For example, if the requested information associated with the one or more input-command characters in input message 420 exceeds a maximum length of the given output message, interface circuit 410 may provide the requested information in a set of output messages 422. As noted previously, the output messages in the set of output messages 422 may specify: a start of the set of output messages 422, a relative or absolute position of a given output message in the set of output messages 422, and the end of the set of output messages 422.

We now describe embodiments of the electronic device. FIG. 5 presents a block diagram illustrating an electronic device 500, such as one of electronic devices 110, 112 and/or 114. This electronic device includes processing subsystem 510 (and, more generally, an integrated circuit or a control mechanism), memory subsystem 512, networking subsystem 514, power subsystem 516, switching subsystem 520 and optional sensor subsystem 524 (i.e., a data-collection subsystem and, more generally, a sensor mechanism). Processing subsystem 510 includes one or more devices configured to perform computational operations and to execute techniques to process sensor data. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510, networking subsystem 514 and/or optional sensor subsystem 524. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as one or more program modules 532), which may be executed in an operating environment (such as operating system 534) by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations and, more generally, communication), including: interface circuit 528 (such as a BTLE communication circuit) and one or more associated antennas 530. (While FIG. 5 includes one or more antennas 530, in some embodiments electronic device 500 includes one or more nodes on interface circuit 528, e.g., pads, which can be coupled to one or more antennas 530. Thus, electronic device 500 may or may not include one or more antennas 530.) For example, networking subsystem 514 can include: a ZigBee® networking subsystem, a Bluetooth networking system (such as BTLE), a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, an infra-red communication system, a power-line communication system and/or another communication system (such as a near-field-communication system or an ad-hoc-network networking system). Note that the combination of interface circuit 528 and at least one of one or more antennas 530 may constitute a radio.

Moreover, networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. In some embodiments, a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices.

Furthermore, electronic device 500 may include power subsystem 516 with one or more power sources 518. Each of these power sources may include: a battery (such as a rechargeable or a non-rechargeable battery), a DC: power supply, a transformer, and/or a switched-mode power supply. Moreover, the one or more power sources 518 may operate in a voltage-limited mode or a current-limited mode. Furthermore, these power sources may be mechanically and electrically coupled by a male or female adaptor to: a wall or electrical-outlet socket or plug (such as a two or three-pronged electrical-outlet plug, which may be collapsible or retractable), a light socket (or light-bulb socket), electrical wiring (such as a multi-wire electrical terminal), a generator, a USB port or connector, a DC-power plug or socket, a cellular-telephone charger cable, a photodiode, a photovoltaic cell, etc. This mechanical and electrical coupling may be rigid or may be remateable. Note that the one or more power sources 518 may be mechanically and electrically coupled to an external power source or another electronic device by one of the electrical-connection nodes in switch 522 in switching subsystem 520.

In some embodiments, power subsystem 516 includes or functions as a pass-through power supply for one or more electrical connectors to an external electronic device (such as an appliance or a regulator device) that can be plugged into the one or more electrical connectors. Power to the one or more electrical connectors (and, thus, the external electronic device) may be controlled locally by processing subsystem 510, switching subsystem 520 (such as by switch 522), and/or remotely via networking subsystem 514.

Furthermore, optional sensor subsystem 524 may include one or more sensor devices 526 (or a sensor array), which may include one or more processors and memory. For example, the one or more sensor devices 526 may include: a thermal sensor (such as a thermometer), a humidity sensor, a barometer, a camera or video recorder (such as a CCD or CMOS imaging sensor), one or more microphones (which may be able to record acoustic information, including acoustic information in an audio band of frequencies, in mono or stereo), a load-monitoring sensor or an electrical-characteristic detector (and, more generally, a sensor that monitors one or more electrical characteristics), an infrared sensor (which may be active or passive), a microscope, a particle detector (such as a detector of dander, pollen, dust, exhaust, etc.), an air-quality sensor, a particle sensor, an optical particle sensor, an ionization particle sensor, a smoke detector (such as an optical smoke detector or an ionizing smoke detector), a fire-detection sensor, a radon detector, a carbon-monoxide detector, a chemical sensor or detector, a volatile-organic-compound sensor, a combustible gas sensor, a chemical-analysis device, a mass spectrometer, a micro-analysis device, a nano-plasmonic sensor, a genetic sensor (such as a micro-array), an accelerometer, a position or a location sensor (such as a location sensor based on the Global Positioning System or GPS), a gyroscope, a motion sensor (such as a light-beam sensor), a contact sensor, a strain sensor (such as a strain gauge), a proximity sensor, a microwave/radar sensor (which may be active or passive), an ultrasound sensor, a vibration sensor, a fluid flow sensor, a photo-detector, a Geiger counter, a radio-frequency radiation detector, and/or another device that measures a physical effect or that characterizes an environmental factor or physical phenomenon (either directly or indirectly). Note that the one or more sensor devices 526 may include redundancy (such as multiple instances of a type of sensor device) to address sensor failure or erroneous readings, to provide improved accuracy and/or to provide improved precision.

During operation of electronic device 500, processing subsystem 510 may execute one or more program modules 532, such as an environmental-monitoring application that uses one or more sensor devices 526 to monitor one or more environmental conditions in an environment that includes electronic device 500. The resulting sensor data may be used by the environmental-monitoring application to modify operation of electronic device 500 and/or the external electronic device, and/or to provide information about the environment to another (separate) electronic device (e.g., via networking subsystem 514) using the communication technique.

Within electronic device 500, processing subsystem 510, memory subsystem 512, and networking subsystem 514, power subsystem 516, switching subsystem 520 and/or optional sensor subsystem 524 may be coupled using one or more interconnects, such as bus 536. These interconnects may include an electrical, optical, and/or electro-optical connection that the subsystems can use to communicate commands and data among one another. Although only one bus 536 is shown for clarity, different embodiments can include a different number or configuration of electrical, optical, and/or electro-optical connections among the subsystems.

Electronic device 500 can be (or can be included in) a wide variety of electronic devices, such as an electronic device with at least one network interface. For example, electronic device 500 can be (or can be included in): a sensor (such as a smart sensor), a tablet computer, a smartphone, a cellular telephone, an appliance, a regulator device, a consumer-electronic device (such as a baby monitor), a portable computing device, an access point, a router, a switch, communication equipment, test equipment, a digital signal processor, a controller, a personal digital assistant, a laser printer (or other office equipment such as a photocopier), a personal organizer, a toy, a set-top box, a computing device (such as a laptop computer, a desktop computer, a server, and/or a subnotebook/netbook), a light (such as a nightlight), a space heater, an alarm, a smoke detector, a carbon-monoxide detector, an environmental monitoring device (which monitors an environmental condition in the environment that includes electronic device 500), and/or another electronic device, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, power subsystems, switching subsystems, and/or sensor subsystems. Moreover, one or more of the subsystems may not be present in electronic device 500. Furthermore, in some embodiments, electronic device 500 may include one or more additional subsystems that are not shown in FIG. 5 such as a user-interface subsystem, a display subsystem, and/or a feedback subsystem (which may include speakers and/or an optical source).

Figure 5:
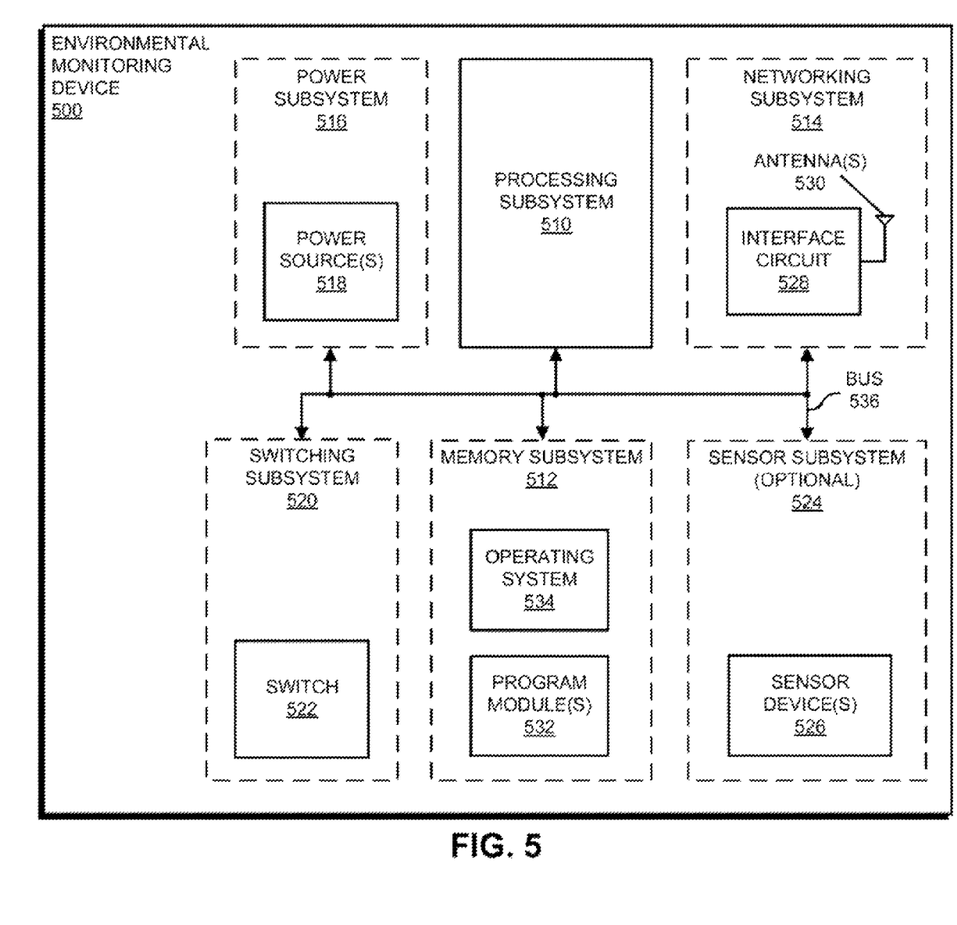
FIG. 5 is a block diagram illustrating one of the electronic devices in FIG. 1 in accordance with an embodiment of the present disclosure.

Although separate subsystems are shown in FIG. 5, in some embodiments, some or all of a given subsystem or component can be integrated into one or more of the other subsystems or component(s) in electronic device 500. For example, in some embodiments program module 522 is included in operating system 534. In some embodiments, a component in a given subsystem is included in a different subsystem.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as one or more radios. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the radios described in single-radio embodiments.

In some embodiments, networking subsystem 514 and/or the integrated circuit include a configuration mechanism (such as one or more hardware and/or software mechanisms) that configures the radios to transmit and/or receive on a given channel (e.g., at a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, etc.)

While a communication protocol compatible with BTLE was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 534 (such as drivers for interface circuit 528) and/or in firmware in interface circuit 528. Alternatively or additionally, at least some of the operations in the communication technique may be implemented in a physical layer, such as hardware in interface circuit 528.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna; and
   an interface circuit, coupled to the antenna, configured to communicate with another electronic device using a Bluetooth Low Energy (BTLE) communication protocol, wherein the electronic device is configured to:
      receive input messages using a predefined characteristic having a numerical identifier to convey input information associated with a set of input attribute types including multiple input attribute types, wherein a given input message includes one or more input-command characters specifying a given input attribute type in the set of input attribute types, an input value in an input argument associated with the given input attribute type, and an input delimiter between the one or more input-command characters and the input argument, and
      wherein the one or more input-command characters, the input delimiter and the input value dynamically repurpose the predefined characteristic to convey any of the set of input attribute types, including an input attribute that is not known in advance; and
      provide output messages using the predefined characteristic to convey output information associated with a set of output attribute types having multiple output attribute types, wherein a given output message includes one or more output-command characters specifying a given output attribute type in the set of output attribute types, an output value in an output argument associated with the given output attribute type, and an output delimiter between the one or more output-command characters and the output argument, and
      wherein the one or more output-command characters, the output delimiter and the output value dynamically repurpose the predefined characteristic to convey any of the set of output attribute types.

2. The electronic device of claim 1, wherein the input delimiter includes one of: a tab, and an ASCII delimiter.

3. The electronic device of claim 1, wherein the input delimiter includes an invalid character for a Service Set Identifier.

4. The electronic device of claim 1, wherein the output delimiter includes a comma.

5. The electronic device of claim 1, wherein a maximum length of the given output message is less than a maximum length of the given input message.

6. The electronic device of claim 1, wherein a maximum length of the given output message is less than or equal to 22 characters.

7. The electronic device of claim 1, wherein, when the electronic device receives an input message with an information request, the electronic device is configured to asynchronously provide one or more output messages with the requested information.

8. The electronic device of claim 7, wherein the one or more output messages are provided over time without the electronic device receiving further input messages related to the information request from the other electronic device.

9. The electronic device of claim 1, wherein, when the electronic device receives an input message with an information request and the requested information exceeds a maximum length of the given output message, the electronic device is configured to provide the requested information in a set of output messages;
  wherein a first output message in the set of output messages specifies a number of output messages in the set of output messages;
  wherein output messages between the first output message and a final output message in the set of output messages specifies its position in the set of output messages and includes a portion of the requested information; and
  wherein the final output message in the set of output messages indicates that the set of output messages is complete.

10. A computer-program product for use in conjunction with an electronic device, the computer-program product comprising a non-transitory computer-readable storage medium and a computer-program mechanism embedded therein to communicate input messages and output messages with another electronic device using a Bluetooth Low Energy (BTLE) communication protocol, the computer-program mechanism including:
  instructions for receiving the input messages using a predefined characteristic having a numerical identifier to convey input information associated with a set of input attribute types including multiple input attribute types, wherein a given input message includes one or more input-command characters specifying a given input attribute type in the set of input attribute types, an input value in an input argument associated with the given input attribute type, and an input delimiter between the one or more input-command characters and the input argument, and
  wherein the one or more input-command characters, the input delimiter and the input value dynamically repurpose the predefined characteristic to convey any of the set of input attribute types, including an input attribute that is not known in advance; and
  instructions providing the output messages using the predefined characteristic to convey output information associated with a set of output attribute types having multiple output attribute types, wherein a given output message includes one or more output-command characters specifying a given output attribute type in the set of output attribute types, an output value in an output argument associated with the given output attribute type, and an output delimiter between the one or more output-command characters and the output argument, and
  wherein the one or more output-command characters, the output delimiter and the output value dynamically repurpose the predefined characteristic to convey any of the set of output attribute types.

11. The computer-program product of claim 10, wherein the input delimiter includes one of: a tab, and an ASCII delimiter.

12. The computer-program product of claim 10, wherein the input delimiter includes an invalid character for a Service Set Identifier.

13. The computer-program product of claim 10, wherein the output delimiter includes a comma.

14. The computer-program product of claim 10, wherein a maximum length of the given output message is less than a maximum length of the given input message.

15. The computer-program product of claim 10, wherein a maximum length of the given output message is less than or equal to 22 characters.

16. The computer-program product of claim 10, wherein the computer-program mechanism includes instructions for asynchronously providing, in response to receiving an input message with an information request, one or more output messages with the requested information.

17. The computer-program product of claim 16, wherein the one or more output messages are provided over time without the electronic device receiving further input messages related to the information request from the other electronic device.

18. The computer-program product of claim 10, wherein the computer-program mechanism includes instructions for providing, in response to receiving an input message with an information request and when the requested information exceeds a maximum length of the given output message, the requested information in a set of output messages;
  wherein a first output message in the set of output messages specifies a number of output messages in the set of output messages;
  wherein output messages between the first output message and a final output message in the set of output messages specifies its position in the set of output messages and includes a portion of the requested information; and
  wherein the final output message in the set of output messages indicates that the set of output messages is complete.

19. An electronic-device-implemented method for communicating input messages and output messages with another electronic device using a Bluetooth Low Energy (BTLE) communication protocol, wherein the method comprises:
  receiving the input messages using a predefined characteristic having a numerical identifier to convey input nformation associated with a set of input attribute types including multiple input attribute types, wherein a given input message includes one or more input-command characters specifying a given input attribute type in the set of input attribute types, an input value in an input argument associated with the given input attribute type, and an input delimiter between the one or more input-command characters and the input argument, and
  wherein the one or more input-command characters, the input delimiter and the input value dynamically repurpose the predefined characteristic to convey any of the set of input attribute types, including an input attribute that is not known in advance; and
  using a control mechanism in the electronic device, providing the output messages using the predefined characteristic to convey output information associated with a set of output attribute types having multiple output attribute types, wherein a given output message includes one or more output-command characters specifying a given output attribute type in the set of output attribute types, an output value in an output argument associated with the given output attribute type, and an output delimiter between the one or more output-command characters and the output argument, and wherein the one or more output-command characters, the output delimiter and the output value dynamically repurpose the predefined characteristic to convey any of the set of output attribute types.

20. The method of claim 19, wherein the method further comprises:

asynchronously providing, in response to receiving an input message with an information request, one or more output messages with the requested information; and wherein the one or more output messages are provided over time without the electronic device receiving further input messages related to the information request from the other electronic device.

* * * * *